United States Patent
Hyams et al.

(10) Patent No.: US 12,352,145 B2
(45) Date of Patent: Jul. 8, 2025

(54) COMPOSITION AND PROCESS FOR ENHANCED OIL RECOVERY

(71) Applicants: Jerrold E. Hyams, New York City, NY (US); Geoffrey Woods, Westport, CT (US)

(72) Inventors: Jerrold E. Hyams, New York City, NY (US); Geoffrey Woods, Westport, CT (US)

( * ) Notice: Subject to any disclaimer, the term of this patent is extended or adjusted under 35 U.S.C. 154(b) by 0 days.

(21) Appl. No.: 18/534,954

(22) Filed: Dec. 11, 2023

(65) Prior Publication Data

US 2025/0188824 A1   Jun. 12, 2025

(51) Int. Cl.
 *E21B 43/24* (2006.01)
 *C09K 8/592* (2006.01)
 *E21B 43/34* (2006.01)

(52) U.S. Cl.
 CPC .............. *E21B 43/24* (2013.01); *C09K 8/592* (2013.01)

(58) Field of Classification Search
 CPC .......... C09K 8/592; E21B 43/24; E21B 43/34
 USPC ........................................................ 166/272.3
 See application file for complete search history.

(56) References Cited

U.S. PATENT DOCUMENTS

| | | | |
|---|---|---|---|
| 3,271,320 A | | 9/1966 | Moore |
| 5,399,270 A | * | 3/1995 | Hen ....................... C09K 8/528 540/472 |
| 6,148,913 A | * | 11/2000 | Collins .................. C09K 8/528 166/263 |
| 7,559,372 B2 | | 7/2009 | Cobb |
| 7,628,909 B2 | | 12/2009 | Cobb |
| 7,691,790 B2 | | 4/2010 | Cobb |
| 8,127,840 B2 | | 3/2012 | Crihan |
| 8,168,173 B2 | | 5/2012 | Crihan |
| 2015/0013984 A1 | * | 1/2015 | Abivin ...................... C09K 8/03 166/300 |
| 2015/0285051 A1 | * | 10/2015 | Miller .................. E21B 43/2408 166/272.3 |

FOREIGN PATENT DOCUMENTS

FR   2735524 A1   6/1995

OTHER PUBLICATIONS

International Atomic Energy Agency, Office of Public Information and Communication, Polonium-210 FAQ sheet, 2 pages.

(Continued)

*Primary Examiner* — William D Hutton, Jr.
*Assistant Examiner* — Ashish K Varma
(74) *Attorney, Agent, or Firm* — Merek, Blackmon & Voorhees, LLC

(57) ABSTRACT

The present invention includes a cost effective custom-designed blend of organic chemicals to stimulate oil production. The invention includes a chemical composition for use in drilling operations for oil recovery and the method of using the chemical composition. The chemical composition includes an ammonia compound, an alcohol or polar organic compound, and aqueous carrier solution. The aqueous carrier solution is of sufficient volume such that it is operable to fully dissolve the ammonia compound and alcohol (or polar organic compound) in the aqueous carrier solution. Heating of the solution may be provide by encapsulated Polonium.

17 Claims, 1 Drawing Sheet

(56) References Cited

OTHER PUBLICATIONS

K. Al-Khasawneh, Determination of the 209Bi(n, γ) 210gBi cross section using the NICE detector, Physical Review C 103, 065805 (2021), 10 pages.

Luca Fiorito, Nuclear data uncertainty analysis for the Po-210 production in MYRRHA, EPJ Nuclear Sci. Technol. 4, 48 (2018), 9 pages.

* cited by examiner

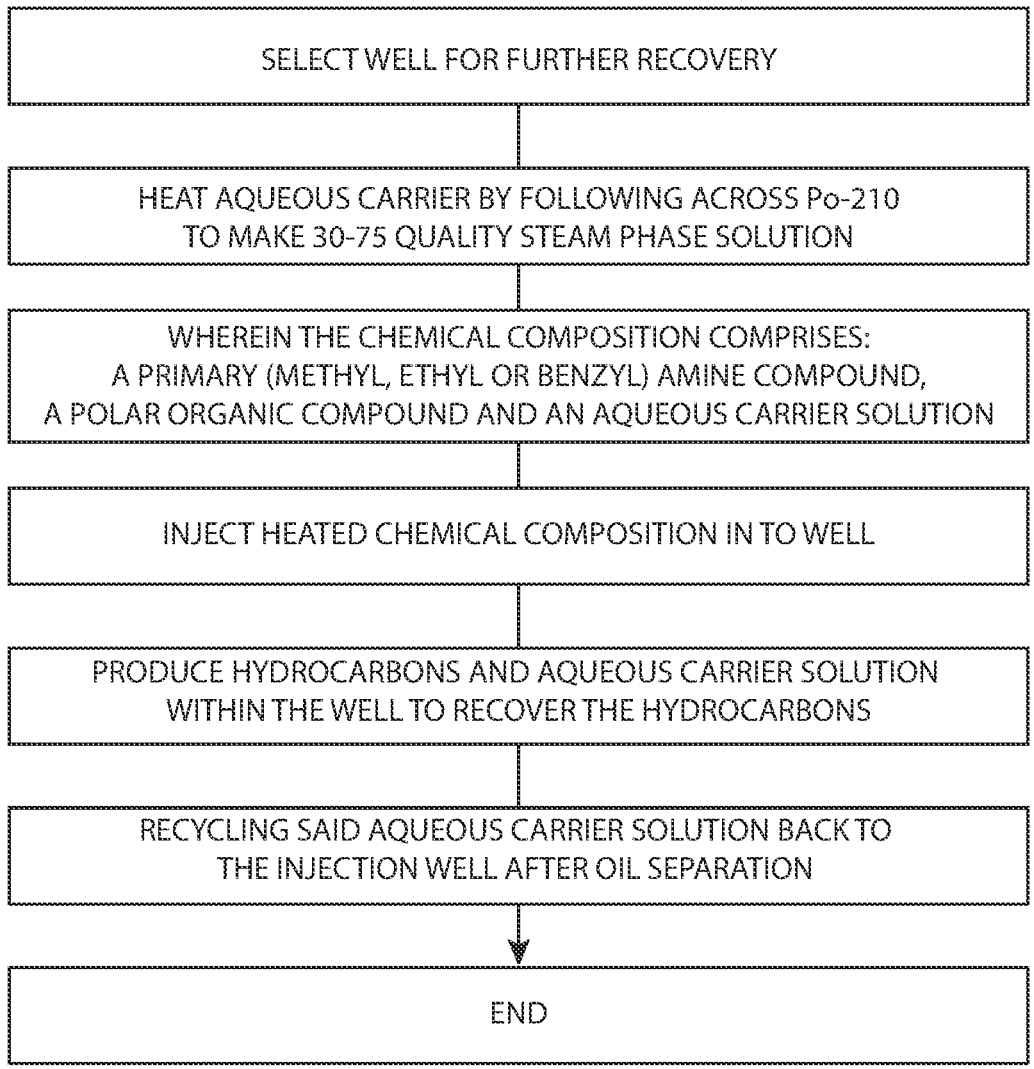

COMPOSITION AND PROCESS FOR ENHANCED OIL RECOVERY

TECHNICAL FIELD OF THE INVENTION

The present invention relates to an improved chemical composition, and the use of the chemical composition and/or heat to increase oil production and reserves. One improvement includes the addition of an amine compound, an alcohol and an aqueous carrier solution. Another improvement is the use of Polonium to heat the above solution at or within the well.

BACKGROUND OF THE INVENTION

When oil is present in subterranean rock formations such as sandstone, carbonate, or shale (collectively referred to herein as a "well"), the oil can generally be exploited by drilling a borehole into the oil-bearing formation and allowing existing pressure gradients to force the oil up the borehole. This process is known as primary recovery. If and when the pressure gradients are insufficient to produce oil at the desired rate, it is customary to carry out an improved recovery method to recover additional oil. This process is known as secondary recovery. Primary oil recovery followed by secondary oil recovery, such as injection of liquids or gas to force out additional oil, are able to remove generally around 30 percent of the total oil content of an oil reservoir in many fields.

In waterflooding, pressurized water is injected into the oil-bearing formation after primary recovery and produced from neighboring hydrocarbon production wells. First hydrocarbon, and subsequently hydrocarbon and water are recovered from the production well.

Even after secondary recovery such as waterflooding, large amounts of the original oil remain in place. The fraction of unrecoverable hydrocarbon is typically highest for heavy oils, tar, and complex formations. In large oil fields, more than a billion barrels of oil can be left after conventional waterflooding. In addition to waterflooding, carbon-dioxide-miscible flood projects are also used. Tertiary recovery then becomes the focus. It is estimated that current tertiary oil recovery techniques have the ability to remove an additional 5 to 20 percent of the oil remaining in the reservoir. Given the current world dependence on fossil hydrocarbons, the development of effective tertiary oil recovery strategies for higher oil recovery promises to have a significant economic impact. Current methods of tertiary recovery are effective, but expensive. Current tertiary methods still leave significant amounts of original oil in place in the field, especially in heavy oil fields.

Much of the remaining oil in place after primary and secondary recovery is in micro-traps due to capillary forces or adsorbed onto mineral surfaces through irreducible oil saturation as well as bypassed oil within the rock formation. Encouraging movement of normally immobile residual oil or other hydrocarbon is commonly termed tertiary recovery. It is known to use microorganisms such as bacteria to dislodge the oil in micro-traps or adsorbed onto mineral surfaces to recover additional oil during the waterflooding phase. This typically involves the introduction of a microorganism from outside. These microbes create methane, which is then recovered.

It is also known that polymers and gelled or crosslinked water-soluble polymers are useful in enhanced oil recovery and other oil field operations. These have been used to alter the permeability of underground formations in order to enhance the effectiveness of water flooding operations. Generally, polymers or polymers along with a gelling agent such as an appropriate crosslinking agent in a liquid are injected into the formation. Both microbe-based and polymer-based enhanced recovery are expensive processes.

The diagenetic fabrics and porosity types found in various hydrocarbon-bearing rocks can indicate reservoir flow capacity, storage capacity and potential for water or $CO_2$ flooding. The goal is to force oil out of high-storage-capacity but low-recovery units into a higher recovery unit. This allows an increase of recovery of oil over predicted primary depletion recovery such that a higher percentage of the original oil in place is recovered.

Traditional tertiary recovery operations include injection of the $CO_2$ or water into the well. There is a need for an improved composition for enhanced oil recovery. It would be advantageous to use commercially available traditional injection facilities to reduce capital expenditures.

To fully capitalize on their national resources, oil-producing countries must enhance domestic petroleum production through the use of advanced-oil recovery technology. Operating companies, typically conservative in stating recoverable reserves, have a need to increase recoverable reserves from proven reserves as opposed to development of unproven reserves. There is a need for cost effective oil recovery techniques to maximize removal of original oil in place per field. There is a need for a costieffective oil recovery technique to reduce development costs by more closely delineating minimum field size and other parameters necessary to successfully recover oil. There is a need for tertiary recovery that can utilize simple or current application procedures.

U.S. Pat. No. 6,225,263 teaches a method of increasing the recovery of oil and/or gas from an underground formation by injecting into the formation an aqueous solution of a mono alkyl ether of polyethylene glycol.

U.S. Pat. No. 3,902,557 describes a method of treating the formation surrounding a well by injection of a solvent including a $C_4$ to $C_{10}$ alkyl ether of a polyglycol ether containing a $C_4$ to $C_{10}$ alkyl ether of a polyglycol ether containing 10-22 carbon atoms per molecule. $C_4$ to $C_8$ monoalkyl ethers of tri and tetra ethylene glycols are preferred in particular the hexyl ether while the butyl ether is also mentioned. The solvent may be diluted with an organic liquid such as alcohol, e.g. isopropanol.

FR Patent No 2735524 is directed toward a method of secondary and tertiary recovery through the use of alcohol in an amount of 1 to 5% by weight to solvate asphaltenes.

U.S. Pat. No. 7,559,372 to Cobb describes a composition and method of use of the composition to improve enhanced oil recovery. The chemical composition included an ammonia compound, an alcohol, and aqueous carrier solution. The aqueous carrier solution was to be of sufficient volume to dissolve the ammonia compound and alcohol in the aqueous carrier solution. The alcohol was from one to about six carbon atoms including methyl, ethyl, propyl, and/or butyl alcohol. The alcohol was preferably nonaromatic. Of the propyl alcohols, isopropyl alcohol is particularly preferred and only 4 to 16 percent by volume of the chemical composition.

However, there still exists a need to capitalize on the original oil in place that is unrecovered by primary and/or secondary recovery methods in an amount exceeding that available to date.

SUMMARY OF THE INVENTION

In order to meet one or more of these needs, the present invention advantageously provides a composition and method for tertiary oil recovery. The invention includes a cost-effective custom-designed blend of organic chemicals to stimulate oil production. Whether through surfactant or solvent action, this composition mobilizes residual oil trapped in the reservoir.

The invention includes an improved chemical composition for use in drilling operations for oil recovery and the method of using the chemical composition that is capable of producing more hydrocarbons than previous chemicals.

In a preferred embodiment, the chemical preferably comprises chemical composition comprises a primary (methyl, ethyl or benzyl) amine compound, an alcohol (or polar compound) and an aqueous carrier solution. The alcohol is preferably butyl alcohol and phenol alcohol.

In a further preferred embodiment, heating of the solution is performed by Strontium or Polonium.

In the chemical composition of the invention, a preferred carrier solution is water. This solution can also be salt water such as produced waters. Aqueous carrier solutions are preferred. In a preferred embodiment, there is only one carrier solution, namely just water. The aqueous carrier solution is preferably a 50% to 75% aqueous solution having a divalent hardness contamination less than 50 ppm.

The invention also includes a process for recovering hydrocarbons from a hydrocarbon formation containing hydrocarbon reserves. The process of the invention includes introducing the chemical composition into the hydrocarbon formation in an amount effective to substantially increase the recovery of hydrocarbons from the formation. The composition may be heated in order to increase its effectiveness. The subsequent recovery of hydrocarbons from the hydrocarbon formation can be through the same well or through other wells in the field.

The current invention can be used as secondary and/or tertiary recovery. The composition of the invention is believed to improve the permeability of the formation adjacent to the well bore.

BRIEF DESCRIPTION OF THE DRAWINGS

So that the manner in which the features, advantages and objects of the invention, as well as others that will become apparent, may be understood in more detail, more particular description of the invention briefly summarized above may be had by reference to the embodiment thereof that are illustrated in the appended drawings, which form a part of this specification. It is to be noted, however, that the drawings illustrate only a preferred embodiment of the invention and are therefore not to be considered limiting of the invention's scope as it may admit to other equally effective embodiments.

FIG. 1 is a simplified flow diagram of injection of the chemical compound of the invention into a reservoir; and

DETAILED DESCRIPTION

For simplification of the drawings, figure numbers are the same in FIG. 1 and FIG. 2 for various streams and equipment when the functions are the same, with respect to the streams or equipment, in each of the figures. Like numbers refer to like elements throughout, and prime, double prime, and triple prime notation, where used, generally indicate similar elements in alternative embodiments.

Alcohols can generally be defined as R—OH where R is a combination of carbon and hydrogen atoms, water being excluded from such definition. The preferred alcohol of the invention is straight chained, as opposed to an aromatic, with a continuous chain of carbon atoms from 1 to 8 carbons long. Saturated alcohols are generally preferred as they tend to be more stable than unsaturated alcohols. Methyl alcohol, ethyl alcohol, i-propyl alcohol, n-propyl alcohol and butyl alcohol are preferred. Propyl alcohol is particularly preferred. Of the propyl alcohols, isopropyl alcohol is particularly preferred. Mixtures of methyl, ethyl, propyl and/or butyl alcohols to create the alcohol of the invention are also encompassed in this invention. A mixture of ethyl and propyl alcohol is preferred. As the chemistry of the alcohol molecule is dominated by the functional OH group, it is understood by those skilled in the art that other alcohols can be effective alone or in combination. However, the use of only one alcohol having a continuous chain of 1 to 8 carbons or only one alcohol, that alcohol being the mixture of the one to eight carbon alcohols without other alcohols, is effective and preferred.

Notably, alcohols can also be created in situ, for example, through the reaction of salts with appropriate reagents in the presence of water. Creation of the alcohol in situ is also encompassed in this invention.

Additionally, surfactants can be added to the chemical composition in order to decrease the water-oil interfacial tension and to improve the efficiency, but the invention provides efficient and cost-effective results through the use of a mixture of only the ammonia compound, the alcohol and the carrier solution.

Ammonia is added to the chemical composition. Ammonia can be provided in many forms, the preferred forms being anhydrous ammonia and ammonium hydroxide. Ammonia can be produced by reaction or dissociation. Ammonium ions such as dissolved ammonium salts are also encompassed within the invention. Ammonia is quite soluble in water, dissolving to the extent of about 700 volumes in 1 volume of solvent. The dissolving process is accompanied by the reaction $NH_3+H_2O$ thereby producing $NH_4++OH--$. This is referred to as ammonium hydroxide. Therefore, ammonium hydroxide, which is often produced commercially with significant amounts of ammonia in water, is included in the term ammonia in this invention. Also encompassed are other precursors that form the ammonium ion in situ.

Isopropyl alcohol, also known as isopropanol, has a formula of $C_3H_80$ and is unsaturated. This is a particularly preferred alcohol of the invention. It is noted that isopropyl alcohol has a boiling point of 82.4 degrees C. and specific gravity: 0.78 at 20 degrees C. The air odor threshold concentration of isopropyl alcohol to be as 22 parts per million (ppm) parts of air. Contact between isopropyl alcohol and air occasionally results in the formation of peroxides, another possible element of the composition, whether added or created in situ. Therefore, an alternate embodiment of the invention includes the addition of peroxide to the ammonia compound and alcohol. Isopropyl alcohol is believed to change the wettability of the strata, particularly at the interface of the fracture and rock matrix. Viscocification is achieved by altering the properties of the reservoir fluid.

Example 1

Anhydrous ammonia is used in this example, Baume 26. TABLE-US-00001 Isopropyl Anhydrous Alcohol Ammonia Water Volume % 8 4 88

The resulting composition was diluted five times such that there was 1 part composition of the invention and 4 parts diluent. Water was used as the diluent. Salt water from produced waters can also be used. This was tested on well and substantially increased recovery was observed.

Example 2

Test is identified as test #1300. Following is a chart comparing the chemical composition of the invention to connate water:
TABLE-US-00002 Surface Viscosity Density #1300 mPa s g/cm3 pH Chemical 0.79 0.958 11.635 Connate 0.83 0.985 9.439 water #1 Connate 0.78 0.982 9.362 water #2

This example was run at concentration of 0% (to mimic connate water), 0.2%, 0.5%, 1.0%, 2.0%, 4.0%, 6.0%, 8.0%, 10%, 15%, 20% and 100%.

The results of these tests indicate that the solubility of the chemical composition is good in different concentration.

Example 3

Test is identified as test #700. Following is a chart comparing the chemical composition of the invention to connate water:
TABLE-US-00003 Surface Viscosity Density #700 mPa s g/cm3 pH Chemical 0.83 0.964 11.791 Connate 0.83 0.985 9.439 water #1 Connate 0.78 0.982 9.362 water #2

The chemical can be recovered and recycled to further decrease costs. The chemical composition does not appear to react with oil nor is a significant amount trapped in the formation. Therefore, the chemical composition can be separated from oil/fluid and recycled.

While the invention has been shown or described in only some of its forms, it should be apparent to those skilled in the art that it is not so limited, but is susceptible to various changes without departing from the scope of the invention.

For example, while this invention has been described as useful for tertiary recovery, it can be used to stimulate production at any point during the life of the well, including in conjunction with secondary flooding. While traditional injection equipment has been described, the invention includes any method of bringing the chemical composition into contact with the oil producing strata. Various means of forming the chemical composition, including creation in situ, are encompassed in this invention. Uses for the chemical composition related to the properties recognized in the composition are also encompassed within this invention. The method of the invention may be applied to well stimulation treatments such as water blocking, sand consolidation, sandstone acidizing and methods of increasing the recovery of oil such as tertiary oil recovery. The chemical composition can be injected into a producing well or at a distance from a producing well to drive the hydrocarbons to the well. Gelled or viscosified means of delivering this chemical composition are also encompassed in the invention.

Further Embodiments

In a further embodiment, the injection fluid comprises a polar organic compound instead of straight chained alcohols, polar organic compounds are envisioned. Alternatively, the polar organic compound may be used to supplement the alcohols.

In order to meet the demand for oil production, it is desirable to use additional means to recover oil from existing deposits that have already been exploited by primary means (natural energies within the field) and by secondary means (by flooding and other methods). Enhanced Oil Recovery means use similar flooding methods, but add chemicals that can treat the water or the oil to result in more oil extraction. When the oil viscosity greatly exceeds that of the motive fluid (for example, water), the water under pressure may be pushed past the oil and be pumped back to the surface. While each formation is different and may be best attacked by various chemicals and methods, the purpose of the chemicals remains to change the interface between the oil and the formation or between the oil and the motive fluid/water. If the viscosity of the oil can be lowered such that it takes less force to release from the formation or if the oil has less viscosity than the water, then the water can push the oil to the surface for recovery.

What is needed is a viable chemical to help push very heavy oils of the type more often seen on the Eastern portion of the United States to enhance production of the oil without deleterious effects.

Polar Organic Compounds ("POC") offer a potential advantage not seen in alkali-surfactant chemicals and other previous chemical methods. Polar compounds are chemical compounds that are held together by polar covalent bonds. "Polar compound refers to those compounds which consist of two or more atoms that are held together by covalent bonds that are polar in nature due to the unequal sharing of electrons. POCs are generally electrically conductive and those that include Hydrogen attached to Nitrogen, Oxygen of Fluorene are most likely polar. Generally, if the compound contain other than oxygen and hydrogen, then they are organic molecules, especially if they contain Oxygen, Nitrogen, Fluorine, Chlorine, Bromine or Iodine.

Polar Organic Compounds tend to have the following properties, which are useful in EOR processes:

They have greater Melting and boiling points than non-polar compounds. They conduct electricity in the solution state due to the mobility of ions, and are highly soluble in polar solvents like water.

By introducing the POCs to the oils, the effect is to lower the viscosity of oil in the formations. The oil can then be induced to flow under the pressure of the water or other motive fluids. The sweep efficiency during recovery can be increased and a useable amount of oil can be recovered in an amount sufficient to make the process effective for use with heavy oils. Other chemicals and methods may be more desirable in less heavy oils than may be motivated by differing methods. Alcohols and POCs may be used in combination, where desirable, to further impact the heavy oils to increase production.

In operation, this invention provides a process for enhanced oil recovery by injection an aqueous injection fluid comprising at least one polar organic compound, injecting the fluid into an underground formation, and recovering an amount of oil mixed with the polar organic compound ("P.O.C"). After preparation of the polar organic compound, the fluid is injected into an underground formation, the formation is swept by the injected fluid to recover an amount of oil. A surfactant, water and/or polymers may be added to provide additional sweep enhancements depending on the particular formation and needs. The POCs may be added a particular temperature (see below), strength and pressure as needed. The amount of fluid may be controlled by the size and geometry of the formation itself. The POC may be used in prior art formations in place of alcohol or alkaline fluids/flooding.

Heating

It may be desirable to heat the aqueous carrier solution (the "solution") in order to increase the impact of the solution on the trapped oil and also to heat the oil in order to decrease the viscosity of the oil to promote flow of the oil out of the well. One source of heating that could be used advantageously is Strontium 90 as described in U.S. Pat. No. 8,127,840, issued to Crihan et al. on Mar. 6, 2012, which is incorporated herein by reference, and summarized below.

Encapsulated Strontium sources presently available can generate heat to about 100 degree Celsius temperature. The sources may be combined, according to necessities, to obtain up to 600 degree Celsius temperature. Strontium 90 is a product of nuclear fission. It is present in significant amounts of spent nuclear fuel, in radioactive waste from nuclear reactors and in nuclear fallout from nuclear tests. It finds extensive use in medicine and in industry. The radioactive decay of Strontium-90 generates a significant amount of heat and is used as a heat source in many radioisotope thermo-electric generators. The main advantage of Strontium 90 is that it is cheaper than alternative sources, such as Cesium 137, is found in nuclear waste, and has been proven efficient in generating heat.

Strontium 90 is currently available in encapsulated (i.e. safely "housed" for transportation and/or operation) form from various sources. The current invention preferably uses existing Strontium 90 sources that have already been encapsulated into individual units. The Strontium may be housed in, for example, a tube shaped thermal generator as a heat source. This heat source would then be lowered down inside the oil well at various depths.

Strontium 90 may be particularly used in the petroleum extraction industry among other applications. It uses radio-isotope heat technology to liquefy the oil wells, to clean paraffin off the tubing walls, and to generate steam for various uses. Almost every working oil well experiences problems with paraffin build up on the inside of the production tubing. This build up may occur on the inside surface of the production tubing or also on the sucker rod, which reciprocates within the tubing. This paraffin buildup forms a restriction in the tubing and reduces the productivity of the oil well. Consequently, almost every oil well must be periodically serviced or as necessary to remove the paraffin build up or to liquefy the viscosity of oil in order to permit the free flow of oil through the production tubing.

The process of oil recovery starts with cleaning up the paraffin inside the surface of the production tubing and the sucker rod by heating the paraffin past its melting temperature. This is done with a small thermal generator containing preferably one or, if necessary, two Strontium 90 sources. After the cleaning of the paraffin, the temperature of the thermal generator needed to further produce the necessary steam for melting the viscosity of the oil must be determined. The temperature may be established by the parameters of the well measured at the site, theoretical calculations or by reference to charts, etc. The heat is thus used to increase the efficiency of these wells, especially wells that have been abandoned because of too much viscosity.

The present invention includes heating an aqueous carrier solution in an annular flow across a tubular encapsulated Strontium 90 source, wherein the Strontium 90 source has a first stabilize surface temperature between 300 F and 400 F; and wherein said heating step transfers enough heat from said Strontium 90 to said aqueous carrier solution to make a 30 to 75 quality steam phase in said aqueous carrier solution;

Polonium Heating

Where Strontium 90 is insufficient to heat the aqueous carrier solution or to treat the trapped oil, Polonium may provide sufficient heating. Strontium may be sufficient for melting paraffins, but for sweeping heavy oils, higher temperatures may be required or desirable. Polonium offers one solution for the higher temperatures of the present invention.

The Genco brothers suggested that the Bismuth ("Bi-209") element is activated with thermal neutrons to make Po-210 alpha decay element to lead reactions for a thermal energy source. U.S. Pat. No. 3,271,320 to Moore, which is incorporated herein by reference, was issued Sep. 6, 1966 and assigned to the U.S. Atomic Energy Commission. The patent shows the Bi-209+n radiochemistry reaction used to make Po-210 alpha decay sources for gas ionization and a method for recovering the Polonium from Bismuth. The Po-210 source is used for other commercial applications today, mainly thermal generators. However no commercial thermal sources have been used in the petroleum field other than Strontium as discussed above. Applicant is unaware of any prior use of the internal conversion of Bi-209 to Po-210 for the thermal heat source. Polonium has a greater alpha activity than Strontium, and Po-210 has enough energy density to compete with natural gas or diesel fuel for a commercial steam generator as a sealed source.

Polonium (including Po-210) is the product of the Bi-209 decay chain. Polonium has a relatively short half life of approximately 138 days prior to decaying to a more stable form of lead. Research shows that the neutron activation of 209Bi is the main mechanism leading to the Polonium production. A potential source of Polonium is from nuclear reactor production utilizing lead-bismuth eutectic (LBE) such as the MYRRAH research reactor in Belgium. Polonium, however, is highly radiotoxic to human and remains in the body for several weeks after exposure. For this reason, Polonium is thus normally considered an undesirable biproduct and find few commercial uses. However, petroleum fields are typically in remote locations, and therefore the dangers of Polonium exposure are greatly reduced versus urban uses.

Polonium-210 has an unusually high level of alpha activity. For this reason, Polonium generates a very high level of heat. According to various sources, a single gram of Po-210 will heat itself to greater than 930 F (>500 C). Po-210 can thus be adequate for use as an atomic heat source at a greater temperature than Strontium-90. According to the International Atomic Energy Agency ("IEAE"), Po-210 has the following current uses, Po-210 "is used in neutron sources (where it is mixed or alloyed with beryllium). It is also used in devices that eliminate static electricity in machinery where it can be caused by processes such as paper rolling, manufacturing sheet plastics, and spinning synthetic fibres. Brushes containing Po-210 are used to remove accumulated dust from photographic films and camera lenses. Static eliminators typically contain from one to tens of GBq of radioactivity." According to the IAEA, Po-210 has also been used a heat source for limited purpose, especially in space, "it has been used as a lightweight heat source to power thermoelectric cells in satellites. A Po-210 heat source was also used in each of the Lunokhod rovers deployed on the surface of the Moon, to keep their internal components warm during the lunar nights." However, because of its immense toxicity, Polonium has been greatly limited in its practical use.

The present invention provides one such novel use of Polonium not heretofore considered, namely, as a heat source in the petroleum industry. The present invention uses Polonium, and especially Po-210, a biproduct from irradiating stable bismuth-209. The Polonium replaces the prior Strontium 90 for use in heating an aqueous carrier solution for use in waterflooding. Whereas Strontium was at a sufficient temperature to melt paraffins, Polonium can provide much higher temperatures for use in reclaiming heavy oils through heated aqueous carrier solutions. Pressurized water including aqueous carrier solution can be injected into the oil-bearing formation after primary recovery and produced from neighboring hydrocarbon production wells. First hydrocarbon, and subsequently hydrocarbon as well as the introduced liquids are recovered from the production well. The liquids may be heated by Polonium, such as Po-210 to a desired temperature to form heated liquids, steam or superheated steam for use in secondary or tertiary recovery of oil from the wells. The liquids or steam heat the oil to use both pressure and temperature adjusted viscosity of the oil to enhance recovery. The Polonium has the further advantage that the Polonium heating may occur at a remote location, such as within the well to decrease the danger to operators from the heated substances. Because Polonium is self-heating, it does not require, for example, electric or gas cables to provide heating energy. The Polonium can thus be used deep within the well to decrease the heat loss from the point of heating to the point of application. The Polonium may also provide some direct heating of the oil at or near the point of application of the Polonium within the well to further the heating effect on the oil to decrease the oil's viscosity.

While this invention has been described as having a preferred design, it is understood that it is capable of further modifications, uses and/or adaptations of the invention following in general the principle of the invention and including such departures from the present disclosure as come within the known or customary practice in the art to which the invention pertains and as maybe applied to the central features hereinbefore set forth, and fall within the scope of the invention and the limits of the appended claims. It is therefore to be understood that the present invention is not limited to the sole embodiment described above, but encompasses any and all embodiments within the scope of the following claims.

We claim:

1. A method of recovering hydrocarbons from a hydrocarbon formation containing hydrocarbon reserves, at least one injection well and one production well, the process comprising the steps of:
   a. injecting a chemical composition into the hydrocarbon formation in an amount effective to, when added to the formation, substantially increase the recovery of hydrocarbons from the reserves,
      wherein the chemical composition comprises a primary (methyl, ethyl or benzyl) amine compound, an alcohol and an aqueous carrier solution;
      said alcohol being selected from the group of butyl alcohol and phenol alcohol; and
      said aqueous carrier solution is a 50% to 75% aqueous solution having a divalent hardness contamination less than 50 ppm;
   b. heating said aqueous carrier solution in an annular flow across a tubular encapsulated Polonium thermal battery, said Polonium therermal battery having a first stabilize surface temperature between 300 F and 400 F;
      wherein said heating step transfers enough heat from said Polonium thermal battery to said aqueous carrier solution to make a 30 to 75 quality steam phase in said aqueous carrier solution;
   c. injecting said 30 to 75 quality steam phase aqueous carrier solution into the hydrocarbon formation containing the hydrocarbon reserves; and
   d. thereby producing hydrocarbons and aqueous carrier solution within at least one production well to recover the hydrocarbons from the formation.

2. Recycling said aqueous carrier solution of claim 1 back to the injection well after oil separation in surface facilities and make up of lost amine and alcohol compound.

3. The process of claim 1, wherein the Polonium thermal battery is provided as a Bismuth element activated by thermal neutrons to cause the Polonium to alpha decay element to lead to release thermal energy source to cause the thermal battery to reach a first stabilize surface temperature between 300 F and 400 F.

4. The process of claim 3, wherein the Polonium in the thermal battery has a half life of about 138 days.

5. The process of claim 1, wherein the Polonium thermal battery is installed within the well bore to provide a heat source at a bottom of the well bore to heat the aqueous carrier solution in the bottom of the well.

6. The process of claim 1, wherein a neutron activation of Bismuth is the main mechanism leading to Polonium production in the Polonium thermal battery to cause the thermal battery to reach a first stabilize surface temperature between 300 F and 400 F.

7. The process of claim 1, wherein the Polonium thermal battery is self-heating and does not require an additional power or heat source in order for the thermal battery to reach a first stabilize surface temperature between 300 F and 400 F.

8. The process of claim 1, wherein the Polonium thermal battery is formed as a Bismuth ceramic plate.

9. A method of recovering hydrocarbons from a hydrocarbon formation containing hydrocarbon reserves, at least one injection well and one production well, the process comprising the steps of:
   a. injecting a chemical composition into the hydrocarbon formation in an amount effective to, when added to the formation, substantially increase the recovery of hydrocarbons from the reserves;
   b. heating said aqueous carrier solution in an annular flow across a tubular encapsulated Polonium thermal battery, said Polonium thermal battery having a first stabilize surface temperature of at least 300 F;
      wherein said heating step transfers enough heat from said Polonium thermal battery to said aqueous carrier solution to make a 30 to 75 quality steam phase in said aqueous carrier solution,
   c. injecting said 30 to 75 quality steam phase aqueous carrier solution into the hydrocarbon formation containing the hydrocarbon reserves, and
   d. thereby producing hydrocarbons and aqueous carrier solution within at least one production well to recover the hydrocarbons from the formation.

10. The process of claim 9, wherein the Polonium thermal battery is provided as a Bismuth ("Bi-209") element activated by thermal neutrons to cause the Polonium to alpha decay element to lead to release thermal energy source to cause the thermal battery to reach a first stabilize surface temperature between 300 F and 400 F.

11. The process of claim 10, wherein the Polonium in the thermal battery has a half life of about 138 days.

12. The process of claim 9, wherein the Polonium thermal battery is installed within the well bore to provide a heat source at a bottom of the well bore to heat the aqueous carrier solution in the bottom of the well.

13. The process of claim 9, wherein a neutron activation of Bismuth is the main mechanism leading to Polonium production in the Polonium thermal battery to cause the thermal battery to reach a first stabilize surface temperature between 300 F and 400 F, wherein the Bismuth is inert prior to said neutron activation.

14. The process of claim 9, wherein the Polonium thermal battery is self-heating and does not require an additional power or heat source in order for the thermal battery to reach a first stabilize surface temperature between 300 F and 400 F.

15. The process of claim 9, wherein the Polonium thermal battery is formed as a Bismuth ceramic plate.

16. The process of claim 9, further including the step of recycling said aqueous carrier solution of claim 9 back to the injection well after oil separation in surface facilities and make up of lost amine and alcohol compound.

17. The process of claim 9, wherein the Polonium thermal battery has an energy density greater than natural gas or diesel fuel for a commercial steam generator as a sealed source.

* * * * *